2 Sheets—Sheet 2.

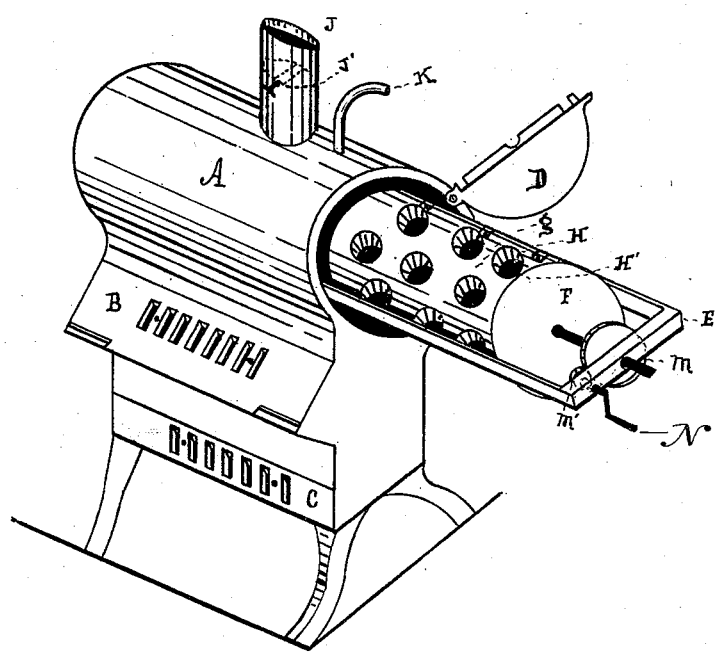
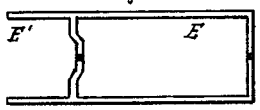
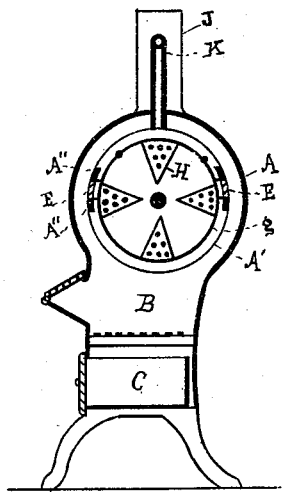

W. LANGNER.
Coffee Roaster.

No. 230,189. Patented July 20, 1880.

Witnesses
Frank P Kinsey
Frank Hartman

Inventor
William Langner
Per Thomas P Kinsey
Atty

UNITED STATES PATENT OFFICE.

WILLIAM LANGNER, OF READING, PENNSYLVANIA.

COFFEE-ROASTER.

SPECIFICATION forming part of Letters Patent No. 230,189, dated July 20, 1880.

Application filed November 26, 1879.

*To all whom it may concern:*

Be it known that I, WILLIAM LANGNER, of the city of Reading, county of Berks, State of Pennsylvania, have invented a new and useful Improvement in Coffee-Roasters, of which the following is a specification.

This invention is more particularly related to the portable class of coffee and peanut roasters.

Heretofore there has been a difficulty in securing the uniform browning of the berry, and many plans have been tried and proved unsuccessful. The evaporation of the moisture to a certain extent has been considered a desideratum; but in ordinary practice the machines have generally evaporated to dryness, and usually, unless closely watched, the scorching of the berry followed.

The object of my invention is to produce the above-desired result with certainty and without complicated machinery.

Figure 4:
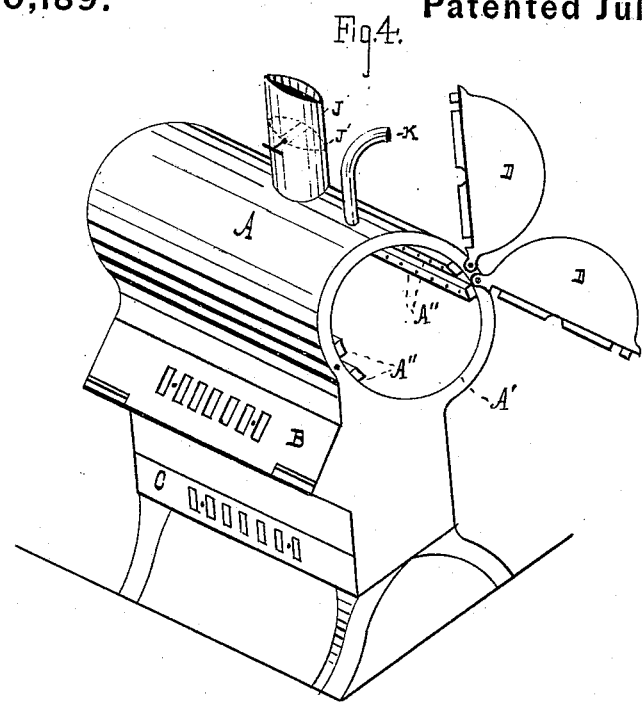
Figure 5:
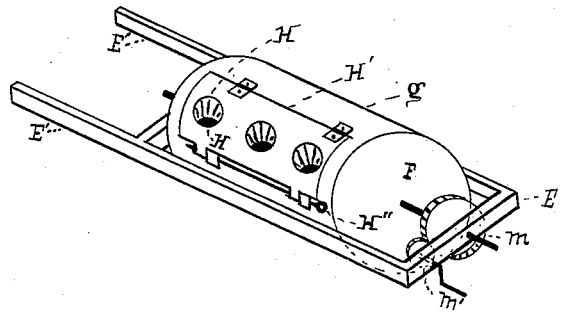

In the accompanying drawings, in which similar letters of reference indicate like parts, Figure 1, Sheet 1, is a perspective view of the portable roaster with the frame and cylinder partially drawn out of the retort. Fig. 2, Sheet 1, is a vertical cross-section, showing the internal construction. Fig. 3 is a plan of the roaster-frame. Fig. 4 is a perspective view of the case with the roasting-cylinder removed. Fig. 5 is a perspective view of the roasting-cylinder in its frame.

Referring to the drawings, A is the outer case, of sheet-iron or other suitable metal. A' is the interior case or retort which surrounds the roasting-cylinder; B, the fire-door; B', the fire-pot.

C is the ash-pit; D, the end doors for closing in the roasting-cylinder; E, the frame in which the roasting-cylinder is hung; E', the ledges in the interior of the retort A', which retains the frame E in place and supports the same when drawn out for the purpose of emptying the cylinder g; F, the cylinder-heads; g, the cylinder-case, of sheet metal; H, perforated inward-projecting tubes, stirrers, and exhausters. These tubes are flattened and closed at their inner ends to give them stiffness, and, to allow more room for the material undergoing roasting, they are spaced alternately with reference to each other around the circumference of the cylinder to continually stir up the berries in the same.

H' is the door through which the cylinder is filled and emptied, secured, when closed, by a pin, H''.

m m' are the gears by which motion is given to the cylinder. In a small machine the power is applied by hand through a crank, N, and in large roasters through a pulley on the shaft M or M', as may be desired.

The operation of the roaster is as follows: The doors D are opened and the frame E, with cylinder g and gears m m', withdrawn far enough out of the retort A' to admit of the opening of the door H', which being done, the cylinder g is filled with the berries to be roasted, door H' closed, and frame E with cylinder and gears returned to the retort, the doors D closing the same. Fire is made in the fire-pot B', and the products of combustion are passed entirely around the case of the retort A', the passage out of the stack J being controlled by the damper J'. In the meanwhile the heat radiated from the retort passes into the cylinder-case g and through the perforated tubes H into and around the berries. This causes a rapid evaporation of the moisture in the berry, which is released from the cylinder by the perforated tubes H, and passes away from the retort A' by the exhaust-pipe K. The color of the steam from the exhaust indicates the condition of the berries in the cylinder, and by observation of that alone the color of the berry and the extent of roasting given can be regulated to a certainty, and any desired amount of moisture may be retained in the cylinder by closing the exhaust-tube K at the proper moment and allowing the cylinder to cool, which, condensing the vapor, would return it again to the berries by the perforated tubes H H.

The frame E, Fig. 3, is extended on the sides past the rear cross-piece or bearing for the shaft a distance sufficient to give full support to the frame E, with the cylinder g and its load of berries, thus doing away with any extraneous supporting accessories.

Holes are provided in the rear end of the case through which the extra length of side frames projects.

This roaster can be adapted for family use, as well as for manufacturing on a large scale.

Having explained my invention, I claim as follows, to wit:

The roasting-cylinder $g$, of sheet metal, having a door, H', for the purpose of filling and emptying the same, and a series of alternating circular openings in the shell, said openings being shielded by inward-projecting tubes H, perforated over their entire surface, and flattened and closed at their extreme inner ends, forming beaters or stirrers for shifting the berries in the cylinder, and exhausters for the moisture arising during roasting, as described, in combination with the frame E and retort A', substantially as shown, and for the purpose specified.

WILLIAM LANGNER.

Witnesses:
JAMES R. KENNEY,
J. C. FELTER.